United States Patent Office 3,439,195
Patented Apr. 15, 1969

3,439,195
METHOD AND APPARATUS FOR RECOVER-
ING SEEDING MATERIAL USED WITH
MHD GENERATORS
Werner Rummel, Erlangen, Germany, assignor to Siemens
Aktiengesellschaft, a corporation of Germany
Filed July 19, 1965, Ser. No. 472,989
Claims priority, application Germany, July 28, 1964,
S 92,299
Int. Cl. H02k 7/00; G21d 7/02
U.S. Cl. 310—11                                    13 Claims

ABSTRACT OF THE DISCLOSURE

MHD generator installation includes discharge vessel receiving gaseous combustion products from the generator for contacting and heating a liquid heat-exchange medium having at one zone of the discharge vessel a temperature just below the boiling point of seeding material used in the generator, supply vessel for combustion air located upstream of the generator, the air being contacted by the heated medium and having at a predetermined zone of the supply vessel a temperature higher than the seeding material boiling point, and conduits for continuously passing heat-exchanging medium from the aforementioned discharge vessel zone to the aforementioned vessel zone.

My invention relates to magnetohydrodynamic (MHD) generators.

In particular my invention relates to a method and apparatus for recovering seeding material used in MHD generators.

The principle of operation of MHD generators involves directing a magnetic field perpendicularly across an electrically conductive gas flow traveling at a very high speed on the order of 1,000 m./sec., and delivering electric power from electrodes arranged perpendicularly both to the gas flow and to the magnetic field.

The operating gas can take the form of a jet of combustion waste gases to which a readily ionizable material, such as alkali metal compounds, the so-called seeding material, is added to increase the electric conductivity. This operation gas has plasma properties and is derived by burning a fuel such as oil or coal dust. The gaseous products of combustion can be brought up to a high speed of movement by being passed through a Laval or Venturi nozzle, and then the stream flows through the channel of the generator in which the electrodes are mounted.

For economically operating MHD generators with combustion waste gases, it is desirable to operate not with pure oxygen but with atmospheric air. This requires that the air be preheated to a temperature higher than 1,500° C., temperatures of over 2,000° C. being preferable.

The heat available from the gaseous products of combustion issuing from the generator can be used to preheat the combustion air. Since at temperatures on the order of 1,500° C. conventional heat-exchangers can no longer be used, various attempts have been made to heat the combustion air from the waste gases with the aid of a heat-exchanging medium which directly contacts the combustion air. This heat-exchanging medium itself is raised to the required temperature, not through walls of a heat exchanger, but rather by direct contact with the gaseous products of combustion which may place some heat-exchanging mediums in a molten condition.

It has been proposed to effect the heat exchange at the surface of molten glass, metals, or metal oxides. For this purpose, the heat-exchanging medium may be circulated through vessels, which respectively receive the gaseous products of combustion and the combustion air, the vessels being similar to the pots or troughs for molten glass employed in glass manufacture.

For further increase in economy, the waste gases issuing from the generator can be used to operate a conventional power plant, as well as turbine-driven compressors for increasing the pressure of the combustion air.

Inasmuch as MHD generators are most economical when of a large size, and it is highly desirable to provide a channel diameter of over 1 m., it is costly to permit the seeding material to escape to the ambient atmosphere together with the waste gases. It is known therefore, to pass the waste gases through gas scrubbers so that at least some of the seed material is recovered. This requires some additional apparatus, which during cold, wet treatment of the waste gases consume more than negligible energy from the waste gases. It has been contemplated to provide MHD generators with a closed circulation for use with expansive and especially well qualified seed material, such as cesium. In plants of this type, the gas issuing from the generator is reheated after each pass and is recycled back to the generator. Such reheating of the gas poses difficult problems so that this solution likewise fails to be satisfactory.

It is a primary object of my invention to provide for an MHD generator a method and apparatus for recovering seed material in a highly efficient manner, avoiding the deficiencies referred to above.

In particular, it is an object of my invention to afford utilizing the heat-exchanging medium itself for the purpose of recovering the seed material.

Also, it is an object of my invention to provide a simple, relatively inexpensive method and apparatus capable of continuously recovering seed material during operation of the MHD generator.

According to my invention, at the region where the heat-exchaging medium is heated by contact with the gaseous products of combustion, there is a zone where the temperature is just beneath the boiling point of the seed material, and from this zone I continuously withdraw part of the heat-exchanging medium and pass it to the combustion air at a zone of the latter where the temperature is higher than the boiling point of the seed material. The heat-exchanging medium withdrawn from the zone where the temperature is less than the boiling point of the seed material is necessarily enriched with seed material which has condensed onto the heat-exchanging medium; and the condensed seeding material is subsequently vaporized at the plate where the withdrawn portion of the heat-exchanging medium is delivered to the combustion air and where the temperature is higher than the boiling point of the seed material. In this way a continuous recovery of the seed material is afforded. Thus, the combustion air to which the continuously withdrawn seed material is delivered becomes enriched with the seed material.

By passing the preheated combustion air through a measuring station where, for example, the electrical conductivity of the combustion air is measured, so that in this way the concentration of seed material can be determined, it is possible to charge the combustion air with additional seed material as may be needed for given operating conditions.

If desired, the amount of heat-exchanging medium withdrawn with the condensed seeding material may be increased until the required amount of seed material is recovered. On the other hand, if the operation should be adjusted to a lesser amount of seed material, then the amount of heat-exchanging medium withdrawn with condensed seed material can be reduced, and the concentration of seed material can be adjusted to the desired value by the charging device which charges additional seed material into the combustion air.

As heat-exchanging medium, liquids formed from molten solids and having a temperature range of from 1,500 to 2,000° C. are most suitable, and these materials are exposed to the waste-gas jet either in liquid form or as granular solids to be reheated by the gas. In principle, ceramic heat storing masses, for example spherical bodies, may be used as heat-exchanging material. However, materials of this type are easily attacked chemically by the seed material and then lose their mechanical strength. Of particular interest, therefore, is an arrangement where the seed material itself is used as a heat-exchanging medium. In this case it is possible simply to spray part of the heat-exchanging medium into the preheated combustion air.

The invention is illustrated by way of example in the accompanying drawings which form part of the application and in which.

Figure 1:
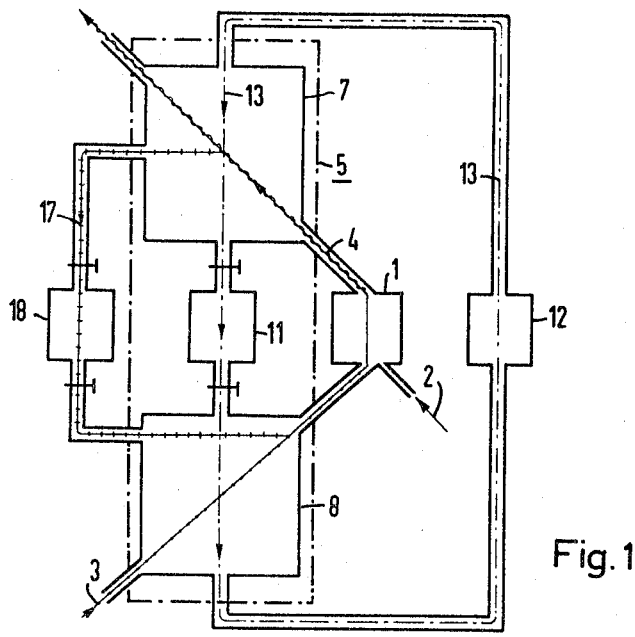
FIG. 1 is a schematic illustration of an installation according to my invention having a single stage heat exchanger.

Referring now to FIG. 1, the schematic layout shown therein illustrates how a fuel 2 is passed to the burner of an MHD generator 1, while compressed combustion air 3, preheated in a vessel 8, is also directed to the generator to be burned together with the fuel 2. The gaseous products of combustion 4, indicated by a wavy line in FIG. 1, have provided the required output of power in the channel of the generator and are then directed through a vessel 7 in which a heat-exchanging medium 13, indicated by a light dot-dash line in the drawing, is heated up and rendered or maintained molten. The temperature of the gaseous products of combustion at the end of the channel of the generator can be on the order of 2,000° C. The heat-exchanging medium is delivered to the vessel 8 for preheating the combustion air therein by direct contact with the combustion air. The heat-exchanging medium can take the form of alumina ($Al_2O_3$), glass, bauxite, pollucite ($Cs_4[Al_4Si_9O_{26}]H_2O$), clay, or metal oxide. The vessels 7 and 8 form a heat exchanger stage indicated by the area within the heavy dot-dash line in FIG. 1.

The seeding material is conventionally a material such as mineral pollucite. At the high operating temperatures in the generator channel the cesium-containing mineral is partly decomposed and enriched with pure cesium.

The heat-exchanging medium is maintained in circulation in molten, or partly in granular, form by way of suitable pumps or by pressure-lock systems 11 and 12. These pressure-lock systems operate with a pressure drop from the relatively high pressure of the combustion air, on the order of 10–20 atmospheres, to the relatively low pressure of the gaseous products of combustion leaving the MHD generator, this latter pressure being on the order 1.5 atmospheres.

In the event that the vessel 7 which receives the gaseous products of combustion is situated at a elevation higher than the vessel 8 which receives the combustion air, the weight of the heat-exchanging medium 13 may be sufficient, at compressions which are not too great, in order to supply the heat-exchanging medium to the vessel 8. In this event, the pressure-lock system 11 can be eliminated. On the other hand, the pressure-lock system 12 becomes unnecessary when the extent to which the combustion air is compressed becomes sufficiently great.

Assuming that the temperature of the heat-exchanging medium at the central zone of the vessel 7 is below the boiling point of the seeding material, then of course the seeding material in the gaseous products of combustion will have condensed into the heat-exchanging medium at this central zone of the vessel 7. At a lower portion of the vessel 7, closer to the point at which the gaseous products of combustion enter the vessel 7, the temperature in the vessel is higher than the boiling point of the seeding material. A part 17 of the heat-exchanging medium is continuously withdrawn from the cooler central region of the vessel 7 and is then directed through the pressure-lock system 18 continuously into the vessel 8 to be returned therein to the remainder of the heat-exchanging medium taken from the hotter zone of the vessel 7. Because the combustion air in the vessel 8 is preheated with the heat-exchanging medium taken from the hot-test part of the vessel 7, close to the point where the gaseous products of combustion leave the generator, the air in the vessel 8 is heated to a temperature higher than the boiling point of the seeding material, and the return of the cooler portion 17 of the heat-exchanging medium continuously into the vessel 8 results in vaporizing of the seeding material from the portion 17 of the heat-exchanging medium so that the seeding material is added to the stream of preheated air which travels to the generator.

The heat-exchanging medium 17, which is continuously withdrawn with condensed seeding material therein, is indicated by the line which has the series of short crossing lines distributed therealong as shown in FIG. 1, while the combustion air 3 is indicated by a line which has a series of dots distributed therealong. It is apparent from FIG. 1 that the line 17 is derived from a central portion of the vessel 7 considerably beyond the point where the gaseous parts of combustion 4 initially enter the vessel 7, while the air 3 is heated in the vessel 8 with a medium derived from a hotter part of the vessel 7 than that from which the portion 17 is removed. Furthermore, the line 17 intersects the line 3 at a point where the combustion air is about to leave the vessel 8 so that it is at a temperature considerably higher than the boiling point of the seeding material, and thus, continuous condensation of seeding material into the portion 17 of the heat-exchanging medium and vaporization of the seeding material back into the combustion air is automatically provided with my invention in a highly reliable manner, resulting in economical and efficient recovery of seeding material.

It is possible in the vessel installation 8 to cool the heat-exchanging medium by introducing it in drop-form into the air stream in the vessel 8, whereupon the drops are cooled to a temperature below the melting point of the heat-exchanging medium. In this way, the drops are converted into solid particulate heat-exchanging medium which then, by way of a suitable conveyor band or a pneumatic piping system, can be returned to the vessel installation 7 where the granular solidified heat-exchanging medium is again heated so as to become molten, preparatory to being recirculated back into the combustion air.

Of course, the fact that the gaseous parts of combustion are required at a part of the vessel 7 to be at a temperature lower than the boiling point of the seeding material will influence the selection of the heat-exchanging medium. Solid bodies, such as spherical ceramic heat-storing masses, have the disadvantage, when chemically attacked by the seeding material, of softening at a temperature so low that sintering takes place, and the operation of conveying the heat-exchanging medium then cannot go forward efficiently.

Figure 2:
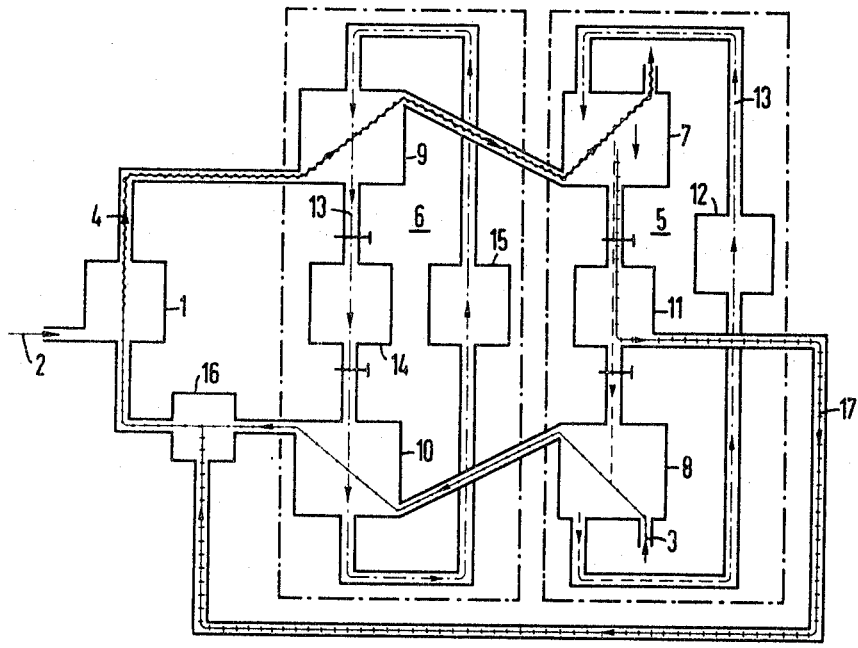
FIG. 2 is a schematic illustration of a two-stage heat exchanger plant, where one of the stages of the heat exchanger is designed for recovering the seed material.

In the schematic diagram of FIG. 2, the heat-exchanging stage 5, indicated by the heavy dot-dash line in both FIGS. 1 and 2, forms part of an installation where recovery of seeding material takes place while an additional heat-exchanging stage 6, which includes vessel 9 and 10 and pressure-lock systems 14 and 15, is connected into the installation in advance of the stage 5. In this embodiment one of the features of my invention resides in using as a heat-exchanging medium in stage 5 the seeding material itself. In this way the problem of compatability between the seeding material and the heat-exchanging medium is solved in the simplest possible manner. The temperature of the heat-exchanging medium in the vessel 7 must then be below the boiling point of the heat-exchanging medium. Correspondingly, the vessel installation 8 does not require any participation in rendering the combination air electrically conductive since only a small amount of seeding material can be vaporized. In this case a portion 17 of the heat-exchanging medium can be delivered by the charging device 16 directly to the combustion air whose temperature after passing through the second stage 6 is higher than the boiling point of the seeding material.

Thus, referring to FIG. 2, it will be seen that between the generator 1 and the stage 5 is situated the additional stage 6. The gaseous products of combustion 4 pass through the vessel 9 of the additional stage 6 before passing through the vessel 7 of the stage 5 from which a part of the heat-exchanging medium is continuously withdrawn, as indicated at 17, to be returned by the charging device 16 directly into the combustion air. This combustion air 3 initially passes through the vessel 8 of the stage 5 and then through the vessel 10 of the stage 6 before passing through the charging device 16 to receive the heat-exchanging medium which is also the seeding material, and by the time the combustion air has passed through both of the vessels 8 and 10, its temperature is higher than the boiling point of the seeding material so that vaporization thereof takes place upon being charged by the device 16 into the combustion air which flows to the generator 1 in the manner indicated in FIG. 2. The pressure-lock systems 14, 15, for the stage 6, and 11, 12, for the stage 5, maintain the heat-exchanging medium 13 circulating in the manner indicated in FIG. 2. It is to be noted that the heat-exchanging medium 13 of the stage 6 flows along a closed circuit and is a material different from the seeding material, although the reference character 13 is used for the heat-exchanging medium for the stage 5 simply for the sake of consistency in using this reference character to indicate the heat-exchanging medium for the various stages of the heat-exchangers indicated in the drawings. In other words, while the heat-exchanging medium 13 of stage 5 is the same as the seeding material, the heat-exchanging medium 13 of stage 6 has a higher melting point than that of the material 13 of stage 5 and, of course, heats the air in the vessel 10 to a temperature higher than the boiling point of the seeding material, as pointed out above.

Figures 3, 4:
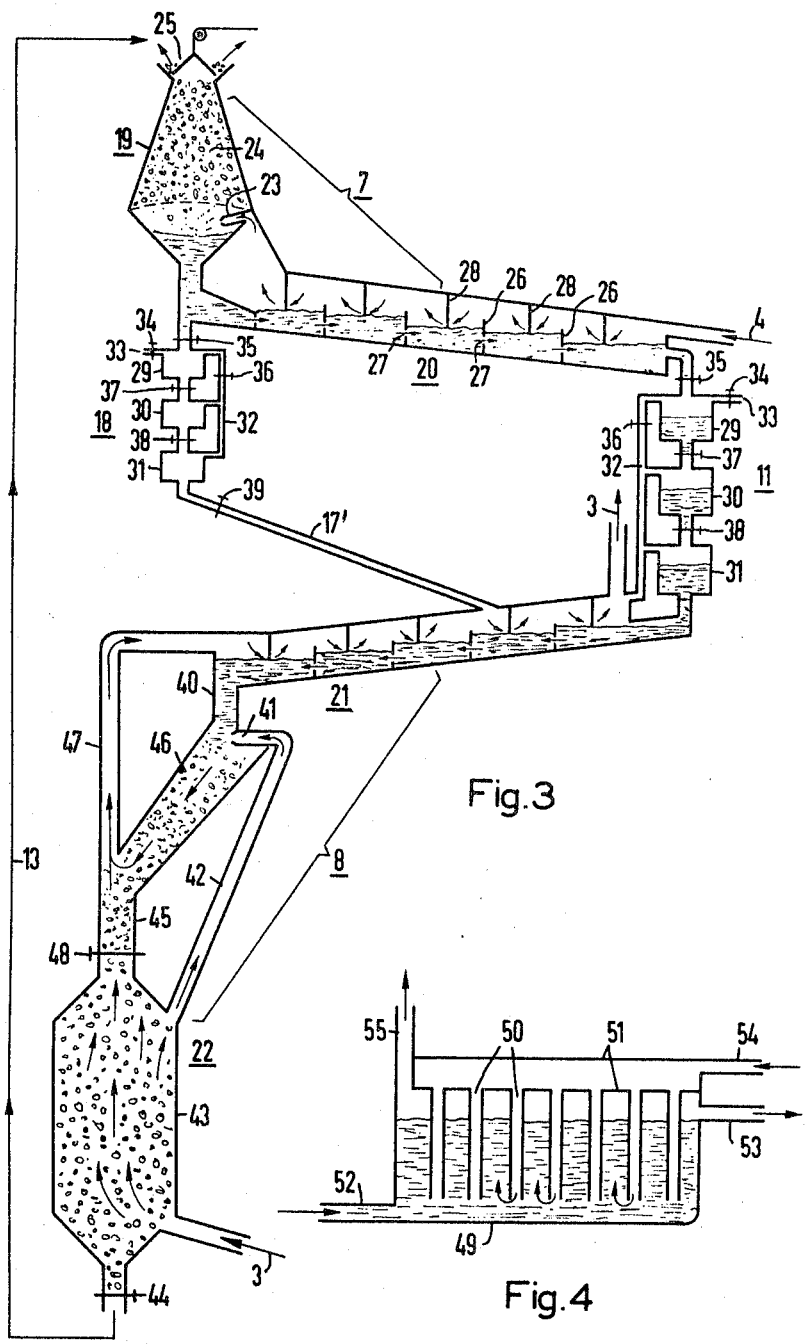
FIG. 3 is a more detailed schematic illustration of one embodiment of an installation according to my invention using a single-stage heat exchanger.
FIG. 4 is a schematic illustration of a seed material separator which can additionally be connected into the stream of waste gases issuing from the generator.

FIG. 3 illustrates schematically, but in a more structural manner, the apparatus used for an embodiment of my invention where the heat exchanger has a single stage.

Referring to FIG. 3, there is illustrated therein the vessel means or installation 7 which receives the gaseous products of combustion 4. This vessel means 7 includes a furnace 19 operating on the principle of a blast furnace and communicating at its lower portion with an elongated enclosure 20 forming a conduit for the molten heat-exchanging medium. The combustion air is directed through a vessel means 8 which includes a second elongated enclosure 21 forming a suitable conduit for the molten heat-exchanging medium, and this enclosure 21 communicates with a precipitator 22 details of which are described below. Between the vessel means 7 and the vessel means 8 are situated the pressure-lock systems 11 and 18 which are also illustrated in greater detail in FIG. 3. A part of the heat-exchanging medium is directed through the conduit 17' to the vessel means 8 through which the combustion air flows to the generator. The return of the heat-exchanging medium is indicated by the line 13 at the left of FIG. 3, and this return flow can be provided through a suitable conveyor band having heat-insulated chambers in which the granular heat-exchanging medium is carried.

Between the arrow 3, shown at the upper central right portion of FIG. 3, and indicating the introduction of preheated combustion air into the generator, and the arrow 4, shown at the upper right of FIG. 3 and indicating the gaseous products of combustion issuing from the channel of the generator, it is to be understood that the generator is connected with its inlet receiving the preheated air 3 and its outlet discharging the gaseous products of combustion 4.

The heat-exchanging medium is assumed in the following description to be a glass which contains potassium silicate, while the seeding material includes potassium in a chemically combined form, such as, for example, potassium carbonate. The melting point of the potassium silicate glass will be, according to its particular composition, in the range of from 800 to 1,000° C.

The furnace 19 is built from magnesite bricks, for example, and the same material is used for the structure of the remaining components of the heat-exchanger which come into contact with the molten solids, and wherever necessary these magnesite bricks are encased within a steel jacket so as to be capable of withstanding the necessary pressures. If desired, the walls of the various parts of the insulation can be composed only of steel which, if necessary, is cooled and is protected from the molten solids by a cooled layer of glass. The gaseous products of combustion are tangentially introduced into the furnace 10 through tuyeres 23 of which only one is indicated for the sake of clarity. In this way the gaseous products of combustion reach the charging chamber 24 of the furnace 19, and these gaseous products of combustion after passing upwardly through the furnace escape beyond the upper top edge thereof where the granular heat-exchanging medium is supplied at the region of a suitable covering hood 25 which can be raised and lowered, in the manner shown schematically at the top of FIG. 3, for controlling the supply of granular heat-exchanging medium into the chamber 24.

Before the initial charging of the furnace 19 with the granular heat-exchanging medium, a combustible material is introduced into the charging chamber 24 at the elevation of the tuyeres. During operation the gaseous products of combustion burn out a hollow region whose roof is self-sustaining. The gaseous products of combustion sinter the materials which slip downwardly through the chamber 24 in a region just above the self-sustaining roof of this region and continuously melt the solids so as to continuously maintain the hollow chamber at the elevation of the tuyeres 23.

Potassium oxide condenses into the gaseous parts of combustion at the material charged in the chamber 24 and slides downwardly with this material to the melting zone, so that just in advance of the melting zone of the furnace the greatest concentration of seeding material obtains. Inasmuch as the boiling point of potassium oxide is in the region of 1,315° C. and the heat-exchanging medium melts at a temperature between 800 and 1,000° C., the heat-exchanging medium which falls in the form of droplets from the roof of the melting zone, downwardly through the latter, is highly enriched with seeding material.

The elongated enclosure 20 communicates with a lower region of the furnace 19, through which the gaseous products of combustion are supplied to the tuyeres 23, and heat is taken from the gaseous products of combustion in the elongated enclosure 20 where the molten heat-exchanging medium flows from the furnace 19 in counter-current to the gaseous products of combustion. In the enclosure 20 the heat-exchanging medium is heated to approximately 1,800° C. The bottom portion of the enclosure 20 is provided with a series of transverse walls 26 each provided with apertures 27 so that the flow of heat-exchanging medium along the downwardly inclined enclosure 20 will be retarded so as to increase the time during which a heat exchange can take place between the heat-exchanging medium and the gaseous products of combustion in the enclosure 20. In addition, the upper portion of the elongated enclosure 20 carries a series of transverse walls 28 which have lower edges situated just beneath the surface of the molten heat-exchanging medium, so that the gaseous products of combustion are required to bubble through the molten heat-exchanging medium in order to pass around the lower edges of the transverse walls 28. In this way the surface of the heat-exchanging medium is maintained turbulent and wavy and is intensely and uniformly heated throughout all of its parts. As a result of the inclination of the enclosure 20 the molten heat-exchanging medium can flow downwardly to the pressure-lock system 11, and the speed of flow of the molten heat-exchanging medium is adapted to the volume of gaseous products of combustion.

The pressure-lock systems 11 and 18 are each of the same construction. Each of these pressure-lock systems includes three chambers or containers 29, 30 and 31. A pressure equalizing conduit 32 communicates with all three chambers of each pressure-lock system. The upper containers or chambers 29 of the pressure-lock systems 11 and 18 respectively communicate with the outer atmosphere through tubular outlets 33, each of which is provided with a control valve 34. The flow of the fluids through each pressure-lock system is controlled through a series of additional valves 35–38, and all these valves, 34–38, can take the form, for example, of suitably cooled closure plugs made of molybdenum.

However, the valves 35, 37, and 38, which respectively control the flow of the molten heat-exchanging medium downwardly into the chambers 29, 30 and 31, can also take the form of suitable cooled tapered steel members situated in cylindrical openings and adjusted through suitable linkages, control rods or the like. During cooling a casing of solidified heat-exchanging medium forms at the exterior of the tapered steel valve members, and this solidified body of heat-exchanging medium forms a good heat barrier and clings to the valve member to seal the latter in its closed position. When the cooling is terminated, and even changed to heating, if required, the layer of solidified heat-exchanging medium around the tapered valve member melts and the valve member can then be raised so as to open the valve.

These valves which control the flow of the molten heat-exchanging medium can, up to 1,300° C., simply take the form of steel cylinders or they can be made of temperature-resistance molybdenum tubing which can optionally be cooled or heated at its exterior. During cooling of the valve members there will be deposited at the walls of the tubular valve members a layer of solidified heat-exchanging medium which eventually closes the opening of the pipe so as to close the valve. By heating this solidified body of material it melts and the valve again opens.

The operation of the pressure-lock systems 11 or 18 to control the flow of heat-exchanging medium commences upon opening of the valves 35 and 34. At this time the valves 37 and 36 are closed. The molten heat-exchanging medium therefore flows into the chamber 29 so as to fill the latter, and air can now freely escape from the interior of the chamber 29 to the outer atmosphere through the open outlet 33. When the chamber 29 is filled the valves 35 and 34 are closed and the valves 36 and 37 are opened. The pressure derived from the pressure-equalizing conduit 32 then acts on the top of the body of molten medium in the chamber 29 to contribute to the downward flow of the latter from the chamber 29 through the open valve 37 into the next lower chamber 30. When this chamber 30 is filled the valve 38 beneath the latter is opened and the molten medium flows at the pressure derived from the equalizing conduit 32 as well as by gravity downwardly into the lowermost chamber 31. This chamber 31 serves as a supply chamber so as to provide a continuous supply of molten heat-exchanging medium during the opening and closing of the valves as described above.

The vessel means 8 which serves to preheat the combustion air, as pointed out above, includes an elongated enclosure 21 which is quite similar to the elongated enclosure 20 and which operates in precisely the same way. However, in this case the elongated enclosure 21 serves to heat up the combustion air to its maximum temperature just before reaching the generator. In the elongated enclosure 21 the molten heat-exchanging medium which is enriched with potassium oxide is delivered to the air through the conduit 17'. The amount of heat-exchanging medium enriched with seeding material which is delivered through the conduit 17' can be controlled by the valve 39. The elongated enclosure 21 together with the particle precipitator 22 form the installation which functions as the vessel means 8 for preheating the combustion air. This vessel means 8 forms a unit of the heat-exchanger stage shown in FIG. 3.

The precipitator 22 which serves to precipitate solid glass bodies from the molten heat-exchanging medium is provided with a tubular inlet 40 which forms the upstream end of the enclosure 21 through which the molten heat-exchanging medium falls downwardly into the precipitator 22. The tubular outlet 40 is considered to be at the upstream end of the enclosure 21 inasmuch as the air which is heated flows toward the downstream end thereof, where the air 3 is directed to the generator, the downstream end of the enclosure 21 of course being situated closer to the generator than the upstream end thereof where the outlet 40 is situated. A part of the air 3 is directed across the stream of downwardly falling molten heat-exchanging medium by a nozzle 41 which communicates through a conduit 42 with the lower container 43 of the precipitator 22. This elongated vertically arranged lower container 43 of the precipitator has an outlet 44 and at its lower region is in communication with the inlet for the combustion air, indicated by the lower arrow 3 of FIG. 3. At its upper portion the container 43 is affixed by a suitable flange to and communicates with a throttling duct 45 of a smaller cross-sectional area than the container 43. The lower part of the throttling duct 45 is provided with an auxiliary valve 48 which can be made up of cooled steel segments capable of being introduced from the exterior and controlling the cross-sectional area of the passage through which the air can move upwardly through the duct 45. The throttling duct 45 communicates with the inclined precipitating chamber 46 as well as with upwardly directed connecting conduit 47. The precipitating chamber 46 surrounds the bottom end of the outlet 40 and the outlet of the nozzle 41 so that the outlet 40 and the nozzle 41 communicate with each other at the upper end of the precipitating chamber 46.

The glass precipitator 22 operates on the following principle:

When the auxiliary valve 48 is closed the compressed combustion air is directed through the conduit 42 to the nozzle 41. The molten heat-exchanging medium flows downwardly through the outlet 40 into the precipitating chamber 46. The stream of air issuing from the nozzle 41 is directed across the downwardly falling molten stream and the pressure of the stream of air issuing from the nozzle 41 is maintained at a value which converts the molten heat exchanging medium into droplets. These glass droplets have their flow restricted in the throttling duct 45 whereupon the auxiliary valve 48 is opened to such an extent that the glass bodies falling downwardly through the open valve 48 still enable the pressure of the air which passes up through the conduit 42 to be sufficiently great to guarantee converting of of the liquid stream into droplets. When the outlet assembly 44 at the bottom of the container 43 is closed, the glass bodies accumulate in the container 43. By providing for the container 43 a cross-sectional area which is considerably greater than that of the throttling duct 45, there remains in the precipitating chamber 46, as compared to the pressure upstream of the nozzle 41, a static pressure sufficiently low to guarantee the breaking up of the molten medium into droplets. When the container 43 and the throttling duct 45 are filled with glass bodies, the outlet device 44 can be opened to permit withdrawal of an amount of granular heat exchanging medium corresponding to the continuously falling amount of the heat exchanging medium received from the elongated enclosure 21.

The combustion air initially introduced into the precipitator 22 is preheated by flowing in counter-current to the glass bodies. The amount of air which flows through the throttling duct 45 is further heated during movement in counter-current to the heat-exchanging medium.

In the event that the discharge vessel means 7 which receives the gaseous products of combustion has a molten heat-exchanging medium returned to it, then, instead of a furnace 19 as seeding material separator, such as that schematically illustrated in FIG. 4, can be used. This separator is connected with further units for further heating the heat-exchanging medium.

The separator shown in FIG. 4 includes, in principle, a relatively flat, closed, and heat-insulated container 49 having an upper double wall 51 from which ceramic tubes 50 extend up to but short of the bottom wall of the container 49. These ceramic tubes 50 communicate with the space between the walls which form the double-walled top 51 of the container 49. A conduit 52 communicates with the lower portion of container 49 for delivering thereto molten heat-exchanging medium which has been returned from the vessel means 8 where the combustion air was preheated, and when flowing through the conduit 52 initially into the container 49 this molten heat-exchanging medium can be approximately at a temperature of 900° C. to which it has been cooled by heat exchange with the air which has been preheated. This heat-exchanging medium flows out of the separator 49 through the overflow conduit 53. The gaseous products of combustion are introduced into the separator 49 through an inlet 54 in the direction of the arrow shown at the upper right of FIG. 4, and from the space between the walls of the double-walled top 51 of the separator 49, the gaseous products of combustion are compelled to flow downwardly through the ceramic tubes 50 issuing through the open bottom ends thereof adjacent the bottom wall of the container or separator 49, so that the gaseous parts of combustion must then bubble through the molten heat-exchanging medium before discharging out through the outlet 55. When the separator of FIG. 4 is connected with gaseous products of combustion entering through the inlet 54, which have initially been cooled to a temperature of less than approximately 1,400° C., then even though the molten heat-exchanging medium is heated, the important factor is that now the potassium compound will condense out of the gaseous products of combustion into the molten heat-exchanging medium.

It is, of course, also possible to provide additional cooling for the separator of FIG. 4, so that when the gaseous products of combustion are too hot, heating of the heat-exchanging medium above the boiling point of the seeding material can still be avoided. Thus, the separator 49 can be made in the form of a steel container having suitably cooled walls, or it can be in the form of a container with magnasite walls and a water-cooled steel insert can be used to conduct the gaseous products of combustion through suitable nozzles to the lower portion of the separator 49.

Figure 5:
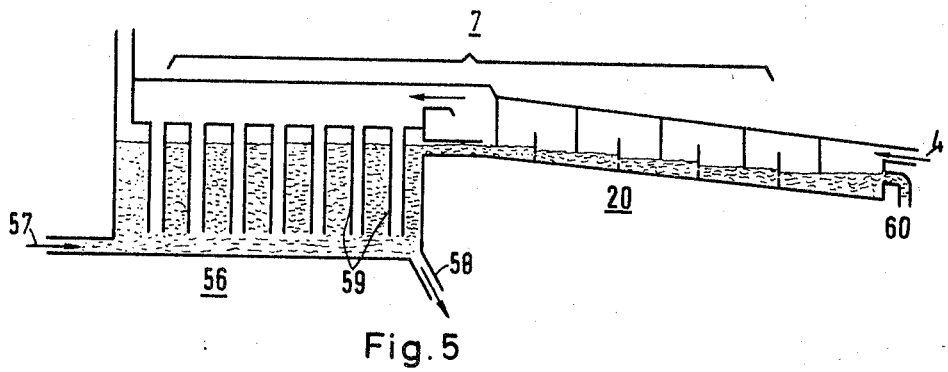
FIG. 5 is a schematic illustration of another embodiment of a heat exchanger structure suitable for use in plants according to the invention.

In the arrangement shown in FIG. 5, the gaseous products of combustion 4 are directed to a discharge vessel means 7 where they give up their heat to the heat-exchanging medium. In this case the vessel means 7 includes a closed container 56 which for the most part corresponds to the separator of FIG. 4 and has connected thereto an elongated enclosure 20 of the construction illustrated at the upper right portion of FIG. 3. The cooled molten heat-exchanging medium is introduced into the container 56 at its lower left portion, as viewed in FIG. 5 and as indicated by the arrow 57, and a part of this heat-exchanging medium is withdrawn through the conduit 58. The introduction of the gaseous products of combustion is provided through the tubes 59 which correspond to the tubes 50 of FIG. 4 and operate in the same way. A discharge conduit 60 at the outlet end of the enclosure 20 leads to a pressure-lock system 11 having the structure shown in FIG. 3. Thus, with the embodiment of FIG. 5 the conduit 58 functions in the same way as the conduit 17' of FIG. 3 to continuously withdraw a part of the molten heat-exchanging medium in which the seeding material has been condensed.

Figure 6:
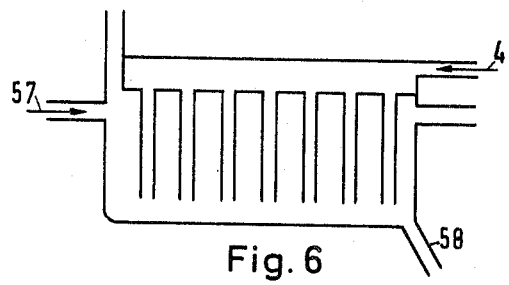
FIG. 6 shows schematically a variation of the embodiment of FIG. 5.

In the embodiment of FIG. 6, the structure is substantially the same as that of FIG. 5, except that the enclosure 20 is omitted and instead the gaseous products of combustion are fed directly to the separator shown in FIG. 6. Also it is to be noted that in this embodiment the molten, relatively cool heat-exchanging medium is introduced in the direction of the arrow 57 at an upper portion of the container shown in FIG. 6.

Thus, with the embodiment of FIG. 6 the gaseous products of combustion will again be introduced below the surface of the molten heat-exchanging medium to bubble upwardly therethrough before discharging from the container, and in this way not only is the molten heat-exchanging medium heated but in addition the withdrawal through the conduit 58 from a lower portion of the heat-exchanging medium of a portion of the latter which is relatively cool will provide for circulation of a part of the heat-exchanging medium in which the seeding material has been condensed.

Figure 7:
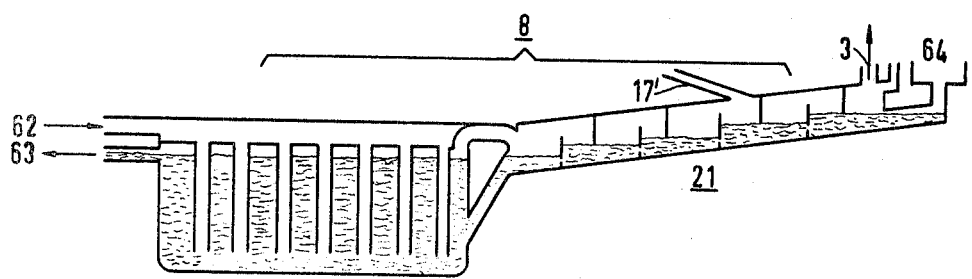
FIG. 7 shows another embodiment of a heat-exchanging structure capable of forming part of an installation of my invention.

FIG. 7 shows how a separator unit 61 substantially identical with those described above can be used in connection with the preheating of the combustion air, so that the structure of FIG. 7 forms a vessel means 8 for heating the combustion air. The unit 61 operates on the same principle as the above separators by causing the fresh combustion air which enters through the inlet 62 into the space between the double walls of the top of the container 61 to move downwardly through the vertical tubes and out through the open bottom ends thereof beneath the surface of the molten heat-exchanging medium so that the air is compelled to bubble upwardly through the heat-exchanging medium before flowing upwardly along the elongated enclosure 21 which is substantially identical with the elongated enclosure 21 shown in FIG. 3. The cooled heat-exchanging medium discharges through the outlet 63 to be returned back to a unit such as that of FIG. 4 or of FIG. 5, and the upper right hand of the enclosure 21 is connected at 64 to a pressure-lock system 11 and is also connected to the conduit which leads the heated combustion air, as shown by arrow 3 at the upper right of FIG. 7, to the generator. The conduit 17' indicated in FIG. 7 of course directs to the heated combustion air heat-exchanging medium enriched with seeding material which vaporizes into the combustion air as described above, and of course this conduit 17' of FIG. 7 can be replaced by the conduit 58 of FIGS. 6 or 5.

Figure 8:
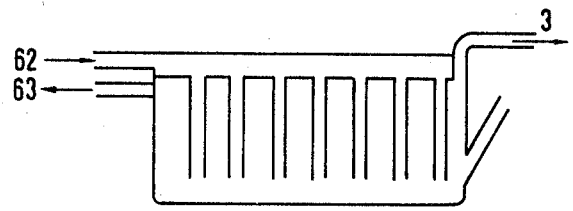
FIG. 8 shows schematically a variation of the structure of FIG. 7.

FIG. 8 shows a construction substantially identical with that of FIG. 7 except that in the case of FIG. 8 the elongated enclosure 21 is omitted and the molten heat-exchanging medium is introduced through the lower right portion of the container of FIG. 8 to maintain the body of molten heat-exchanging medium sufficiently deep to force the air entering through the inlet 62 to bubble upwardly through the heat-exchanging medium when flowing out through the open bottom ends of the vertical tubes communicating with the space between the walls which form the double-walled top of the container of FIG. 8. With the embodiment of FIG. 8 by the time the air discharges at the upper right portion of the structure shown in FIG. 8 to flow to the generator, it has been sufficiently heated to vaporize the recovered seeding material.

Figure 9:
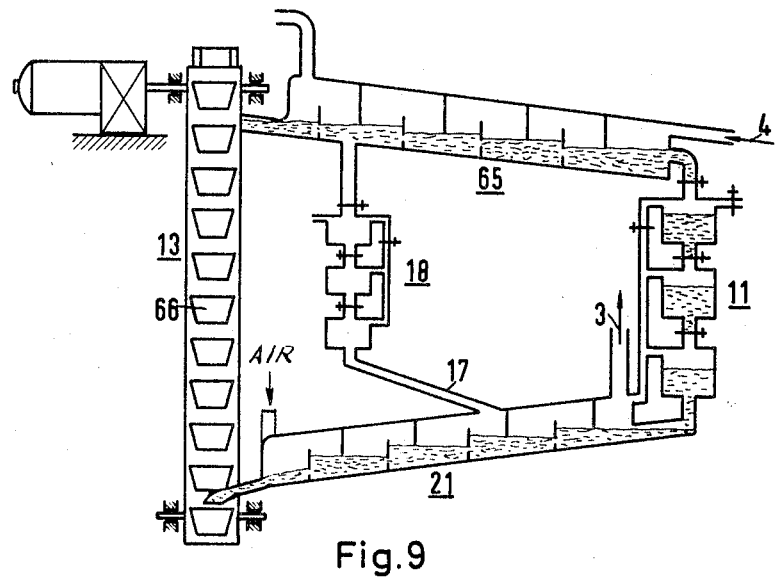
FIG. 9 illustrates still another embodiment of a heat-exchanging installation according to my invention capable of recovering seeding material.

Referring now to FIG. 9, there is illustrated therein an embodiment in which only elongated enclosures similar to the enclosures 20 and 21 are included. Thus, in this case, the gaseous products of combustion 4 move upwardly through the elongated container 65 which is of a construction identical with the elongated container 20 and which receives the molten heat-exchanging medium from buckets 66 of a conveyor which extends along the path 13. The gaseous products of combustion discharge from the upper left portion of the elongated enclosure 65 from which the molten heat-exchanging medium flows downwardly through the pressure-lock systems 11 and 18, as indicated in FIG. 9. Inasmuch as the pressure-lock system 18 communicates with the elongated enclosure 65 and a portion thereof sufficiently spaced from the lower right end of the enclosure which initially receives the gaseous products of combustion, the molten heat-exchanging medium which flows through the lock system 18 is still sufficiently cool to be below the boiling point of the seeding material which has thus condensed into the molten heat-exchanging medium which flows through the pressure lock system 18 and along the conduit 17′ to the lower elongated enclosure 21 which receives the molten heat-exchanging medium from the pressure lock system 18 and directs it out into the buckets 66 of the continuously operating conveyor which at its upper end dumps the molten material into the elongated enclosure 65 where its temperature is increased. The combustion air enters through the lower left end of the elongated enclosure 21 and flows upwardly through the latter before discharging at the upper right hand corner thereof, shown in FIG. 9 as indicated by the arrow 3 which indicates the flow of the preheated combustion air to the generator. By the time the combustion air reaches the lower open end of the conduit 17′ this combustion air is at a temperature higher than the boiling point of the seeding material so that the seeding material will become vaporized and reintroduced into the generator with the combustion air. At any of the discharge ends of the conduits 17, 17′, or 58 where the continuously withdrawn portion of the heat-exchanging medium, enriched with condensed seeding material, is introduced into the combustion air, it is possible to provide a suitable nozzle, spray device, or the like, to discharge the molten heat-exchanging medium, enriched with seeding material, in atomized or particulate form into the combustion air so as to easily vaporize into the later the seeding material which becomes in this way separated from the heat-exchanging medium.

Of course, the above described devices of my invention can be used in other types of heat exchangers. For example, the combustion air can have the molten heat-exchanging medium supplied thereto through an apertured plate which causes the molten heat-exchanging medium to fall in droplets into the stream of combustion air.

Where the combustion air is heated by being bubbled through the molten heat-exchanging medium, this medium is maintained in molten condition when returned to the vessel means 7 where it is heated by the gaseous products of combustion. Also the vessel means 7, which is used for heating the heat-exchanging medium with the gaseous products of combustion, can be constructed so as to provide droplets of the heat-exchanging medium which fall through the stream of gaseous products of combustion to be heated thereby.

Also, it is apparent from the above description of various embodiments that with the process of my invention, it is possible to omit various units of the heat-exchanging installation in order to adapt it to the particular economic requirements of a given installation. Thus, where only molten heat-exchanging medium is circulated throughout the apparatus, it is possible to operate only with a pair of elongated enclosures 65 and 21, as indicated in FIG. 9.

I claim:

1. In a MHD generator installation wherein a seeding material of a given boiling point is used, discharge vessel means receiving gaseous products of combustion from the generator and placing the gaseous products of combustion in contact with a liquid heat-exchanging medium situated in said discharge vessel means to heat the liquid heat-exchanging medium, said medium having at one zone of said discharge vessel means a temperature just under said boiling point of the seeding material, supply vessel means communicating with and situated upstream of the generator for supplying combustion air to be burned with a fuel, thus producing the gaseous products of combustion received in said discharge vessel means, said supply vessel means placing the combustion air which flows therethrough directly in contact with the liquid heat-exchanging medium which has been heated by the gaseous products of combustion and which thereafter is transferred to the supply vessel means, the combustion air in the supply vessel means having at a predetermined zone thereof a temperature higher than the boiling point of the seeding material, and conduit means communicating with both of said vessel means at said zones thereof for continuously withdrawing liquid heat-exchanging medium from said zone of said discharge vessel means just below said boiling point and delivering the thus withdrawn liquid heat-exchanging medium to said zone of said supply vessel means which is above the boiling point of the seeding material.

2. In a MHD generator as recited in claim 1, said discharge vessel means comprising a furnace having a lower portion receiving the gaseous products of combustion and forming said zone with which said conduit means communicates, and said discharge vessel means having an elongated enclosure communicating with said lower portion of said furnace and receiving the gaseous products of combustion in advance of said furnace to provide a heating area upstream of the furnace, means communicating with an upper portion of the furnace for charging the latter with the heat-exchanging medium in granular form, said medium in granular form being placed in a liquid state as a result of heating while advancing downwardly through the furnace.

3. In an MHD generator as recited in claim 2, said elongated enclosure having a trough portion along which molten heat-exchanging medium flows.

4. In an MHD generator as recited in claim 2, said supply vessel means including a second elongated enclosure receiving the molten heat-exchanging medium from the elongated enclosure of said discharge vessel means and having a downstream end and an upstream end, said downstream end of said second enclosure being situated nearer to the generator than said upstream end thereof and the combustion air flowing through said second enclosure from said upstream towards said downstream end thereof to be heated by direct contact with the molten heat-exchanging medium flowing along the interior of said second enclosure from said downstream toward said upstream end thereof, said second enclosure at said upstream end thereof directing the molten heat-exchanging medium along a path where the molten medium falls downwardly, said supply vessel means further including a nozzle for directing combustion air transversely across the downwardly falling molten heat-exchanging medium to convert the latter into droplets, and said supply vessel means directing part of the combustion air upwardly through the downwardly falling droplets prior to directing the combustion air along the interior of said second enclosure to flow out of the latter through said downstream end thereof to the generator.

5. In a generator as recited in claim 4, said second enclosure also having an elongated trough portion along which the molten heat-exchanging medium flows.

6. In a generator as recited in claim 1, said discharge vessel means having an interior portion in which molten heat-exchanging medium is situated with an upper surface of the medium situated beneath the top of the discharge vessel means, said conduit means communicating with a portion of the molten medium in said discharge vessel means and second conduit means communicating with said discharge vessel means for directing the molten heat-exchanging medium to and from the discharge vessel means while maintaining the molten medium therein with a free upper surface, and gas-conduit means communicating with the interior of said discharge vessel means and with the generator for directing the gaseous parts of combustion downwardly into the liquid heat-exchanging medium beneath the upper surface thereof for heating the molten medium with at least part of the heat of the gaseous parts of combustion.

7. In an MHD generator as recited in claim 6, said gas-conduit means having a plurality of open ends situated beneath the surface of the molten medium and through which the gaseous products of combustion flow so as to bubble upwardly through the molten heat-exchanging medium after leaving the open ends of the gas-conduit means.

8. In an MHD generator as recited in claim 6, said supply vessel means including a container receiving molten heat-exchanging medium and including a gas conduit directing the combustion air downwardly into the molten medium so as to bubble upwardly therethrough, and said supply vessel means including an additional heating portion for heating the combustion air in addition to the heating thereof by bubbling through the molten heat-exchanging medium.

9. In a MHD generator as recited in claim 8, said additional heating of the combustion air being provided by a further structure for bubbling the combustion air through the molten heat-exchanging medium.

10. In a generator as recited in claim 1, each of said vessel means having at least in part a structure similar to that used for troughs which receive molten glass.

11. In an MHD generator which uses a seeding material of a given boiling point, means for directing gaseous products of combustion of the generator, which contain the seeding material in gaseous form, along a predetermined path in engagement with a liquid heat-exchanging medium which at a part of said path is at a temperature below said boiling point so that the seeding material condenses into the liquid heat-exchanging medium at the part of the path where the medium has a temperature below said boiling point, means for directing combustion air to the generator to be burned therein with a suitable fuel, the gaseous products of combustion being derived from the burning of the combustion air together with said fuel, means for directing the liquid heat-exchanging medium which has been heated by the gaseous products of combustion into contact with the combustion air so as to preheat the latter, said combustion air having at one point a temperature higher than the boiling point of the seeding material, and means for directing the liquid heat-exchanging medium from said part of said path where it is at a temperatur lower than the boiling point of the seeding material, so as to contain the latter in condensed form, to the combustion air at the region where the latter is at a temperature higher than the boiling point of the seeding material, so that the seeding material is vaporized into the combustion air to be fed with the latter to the generator, whereby the seeding material can be continuously recovered to circulate through the entire installation.

12. In a generator as recited in claim 11, said heat-exchanging medium having a granular solid form at room temperature, means feeding the granular solid heat-exchanging medium to the gaseous products of combustion to be heated thereby into a liquid state prior to being directed to the combustion air for heating the latter, and means directing the combustion air into contact with the liquid heat-exchanging medium to convert the latter into droplets which subsequently solidify to again form granular heat-exchanging medium.

13. In a generator as recited in claim 12, and conveyor means conveying the granular heat-exchanging medium from the region where it has been converted into granular form by combustion air to a region where it is fed to the gaseous products of combustion to again be rendered molten thereby.

References Cited

UNITED STATES PATENTS

| | | | |
|---|---|---|---|
| 3,185,457 | 5/1965 | Boll et al. | 263—19 |
| 3,223,860 | 12/1965 | Brill | 310—11 |

DAVID X. SLINEY, *Primary Examiner.*